(12) United States Patent
Smith

(10) Patent No.: US 12,158,425 B2
(45) Date of Patent: Dec. 3, 2024

(54) ADJUSTABLE EXTENDED FOCUS RAMAN SYSTEM

(71) Applicant: THERMO SCIENTIFIC PORTABLE ANALYTICAL INSTRUMENTS INC., Tewksbury, MA (US)

(72) Inventor: Malcolm C. Smith, Winchester, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 821 days.

(21) Appl. No.: 17/125,210

(22) Filed: Dec. 17, 2020

(65) Prior Publication Data

US 2021/0190693 A1    Jun. 24, 2021

Related U.S. Application Data

(60) Provisional application No. 62/950,837, filed on Dec. 19, 2019.

(51) Int. Cl.
| | | |
|---|---|---|
| *G01N 21/65* | (2006.01) | |
| *G02B 7/10* | (2021.01) | |
| *G02B 27/09* | (2006.01) | |
| *G02B 27/30* | (2006.01) | |

(52) U.S. Cl.
CPC .............. *G01N 21/65* (2013.01); *G02B 7/10* (2013.01); *G02B 27/0927* (2013.01); *G02B 27/0955* (2013.01); *G02B 27/30* (2013.01); *G01N 2201/06113* (2013.01); *G01N 2201/062* (2013.01); *G01N 2201/0633* (2013.01); *G01N 2201/0636* (2013.01)

(58) Field of Classification Search
CPC .. G01N 2201/0633; G01N 27/30; G01N 7/18; G01N 7/105; G01N 7/09; G01N 27/0927; G01N 7/10; G01N 21/65
See application file for complete search history.

(56) References Cited

U.S. PATENT DOCUMENTS

| | | | |
|---|---|---|---|
| 9,285,593 B1 | 3/2016 | Laskin et al. | |
| 10,688,599 B2 * | 6/2020 | Liu | .................. B23K 26/0617 |
| 11,217,962 B2 * | 1/2022 | Arakawa | ................. H01S 3/034 |
| 2005/0122597 A1 * | 6/2005 | Tanaka | ................ G11B 7/1378 |
| 2006/0061882 A1 | 3/2006 | Sun | |

(Continued)

FOREIGN PATENT DOCUMENTS

EP    3311947 A1 *  4/2018  ......... B23K 26/0648

OTHER PUBLICATIONS

PCT/US2020/065596, International Search Report and Written Opinion, Mar. 23, 2021, 9 pages.

(Continued)

*Primary Examiner* — Christopher Stanford
*Assistant Examiner* — Journey F Sumlar
(74) *Attorney, Agent, or Firm* — William R. McCarthy, III

(57) ABSTRACT

An embodiment of a system is described that comprises a light source configured to produce a light beam; a collimating lens disposed on a movable mount, wherein the collimating lens is configured to capture the light beam and produce a substantially collimated beam; and an aspheric diffuse ring optic configured to receive the collimated beam and produce a spot on a surface that comprises a non-uniform radial intensity distribution.

17 Claims, 8 Drawing Sheets

(56) References Cited

U.S. PATENT DOCUMENTS

| | | |
|---|---|---|
| 2010/0302396 A1 | 12/2010 | Golub et al. |
| 2010/0328746 A1 | 12/2010 | DaQUINO et al. |
| 2012/0194814 A1* | 8/2012 | Wang .................. G01J 3/44 |
| | | 250/200 |
| 2013/0331709 A1* | 12/2013 | Le .................. G02B 6/0008 |
| | | 600/478 |
| 2015/0062573 A1 | 3/2015 | Liu et al. |
| 2016/0260513 A1* | 9/2016 | Pan .................. G01N 15/1484 |
| 2018/0101015 A1 | 4/2018 | Hu et al. |
| 2018/0133837 A1* | 5/2018 | Greenberg ......... G02B 27/0955 |
| 2018/0236605 A1* | 8/2018 | Finuf .................. B23K 26/26 |
| 2019/0119150 A1* | 4/2019 | Burket ............... C03C 23/0025 |
| 2019/0129074 A1* | 5/2019 | Oda .................. G02B 3/06 |

OTHER PUBLICATIONS

EP20902865.3, Extended European Search Report, Dec. 6, 2023, 8 pages.

* cited by examiner

FALSE COLOR SPOT IMAGE

ADJUSTABLE EXTENDED FOCUS RAMAN SYSTEM

CROSS-REFERENCE TO RELATED APPLICATIONS

The present application claims the priority benefit from U.S. Patent Application Ser. No. 62/950,837, filed Dec. 19, 2019, which is hereby incorporated by reference herein in its entirety for all purposes.

FIELD OF THE INVENTION

The invention generally relates to an apparatus for conducting Raman spectroscopy which utilizes an aspheric diffuse ring producing optic, or ADRPO, to generate an illumination spot with a variable radial intensity and a simple movable optic to alter the diameter of the illumination spot.

BACKGROUND

Optical scanning methods such as Raman spectroscopy can provide useful information about unknown materials. By identifying unknown materials, certain threats posed by hazardous materials can be reduced or eliminated. While the problem of fluorescence can be avoided completely by removing the material from its container, in field applications this is not normally an option. Sampling can also cause contamination of the sample or cast doubts on the integrity of the sampling method by untrained personnel.

Ideally a Raman spectroscopy system can test a sample while it is still in its packaging container. A fundamental problem with sampling through a container wall is that the packaging materials cause excessive fluorescence signal potentially obscuring the Raman signal from the material under test (e.g. diffuse scattering).

Such diffusely scattering packaging materials are frequently encountered in many common applications. Examples of such include but are not limited to plastic bottles, paper labels, baggies, vials, blister packaging, etc. The diffusely scattering packaging materials encountered in such applications are often highly heterogeneous and can be made of various layers each having a different chemical make-up.

Therefore, a primary goal for analytical spectroscopy is to provide a system capable of determining the chemical composition of packaged materials in a non-destructive manner.

BRIEF SUMMARY

Systems, methods, and products to address these and other needs are described herein with respect to illustrative, non-limiting, implementations. Various alternatives, modifications and equivalents are possible.

In general, in a first aspect, the disclosure features an apparatus that produces an illumination spot on the sample surface that has a non-uniform radial intensity profile that can further be adjusted in diameter. The spot could be of uniform radial intensity but of much larger diameter than the sampling optics field of view. Alternatively, the spot could be of non-uniform radial intensity, with weaker portions near the collection area. These weaker portions produce lower background or interfering Raman signal, thus allowing a potentially higher signal to noise in the sample signal. It might be desirable to focus the light source beam to a tight focus exactly at the collection area, in order to measure the package's Raman spectrum directly in a more traditional Raman arrangement. This packaging spectrum could then be used to remove background signal from any other spectrum containing both package and content signals. The present disclosure shows how to move a single lens in the system to change the excitation between distributed and tight focus conditions.

The size of the spot can be altered from compact (e.g. about 50 micron) to large (e.g. about 5 mm) while remaining centered on the same location. The sampling optic could also be altered in size in conjunction with the size change of the illumination spot. The sampling optic could alternately be moved or resized in conjunction with the change in illumination spot.

For use in a handheld analysis device where compact size is advantageous. Additional mirrors and focusing elements may be employed in order to fit the optic design into the available constraints. Use of such off-the-shelf components for manipulating the beam path have been contemplated by the inventors.

For use in emergency situations where speed of analysis is a concern. Minimizing the time required, particularly the time required collecting data, it of importance to field personnel who may be operating in hazardous environments.

For use in handheld analysis device where simplicity and ruggedness of the moving elements is appreciated. The movement of just a single component in the optical design is advantageous as it reduces the complexity of the device and reduces the opportunities for mechanical failure. The simple linear motion also allows for more rugged solutions amenable to the handheld application space.

This invention is intended for use by field personnel in outdoor environments as opposed to laboratory personnel in controlled environments. This use model necessitates a high level of automation, ruggedness, and highly values ease-of-use. The automated system control of spot size and/or detection size allows for use of the device with a minimum level of expertise in spectroscopy. The desire to minimize the complexity and increase the robustness can also be appreciated in the field-use application.

We have disclosed a design producing a distributed illumination spot with lower intensity near the center, and a means of collapsing the spot into a tight focus. The lower intensity of the distributed spot near the center allows for collecting Raman scattering spectra of materials inside a package, while the tighter focus spot allows sampling the packaging material spectrum so that it may be later subtracted from spectra containing both sample and packaging components.

Embodiments of the apparatus and method can also include any of the other features or steps disclosed herein, as appropriate. The details of one or more embodiments are set forth in the accompanying drawings and the description below. Other features and advantages will be apparent from the description, drawings, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
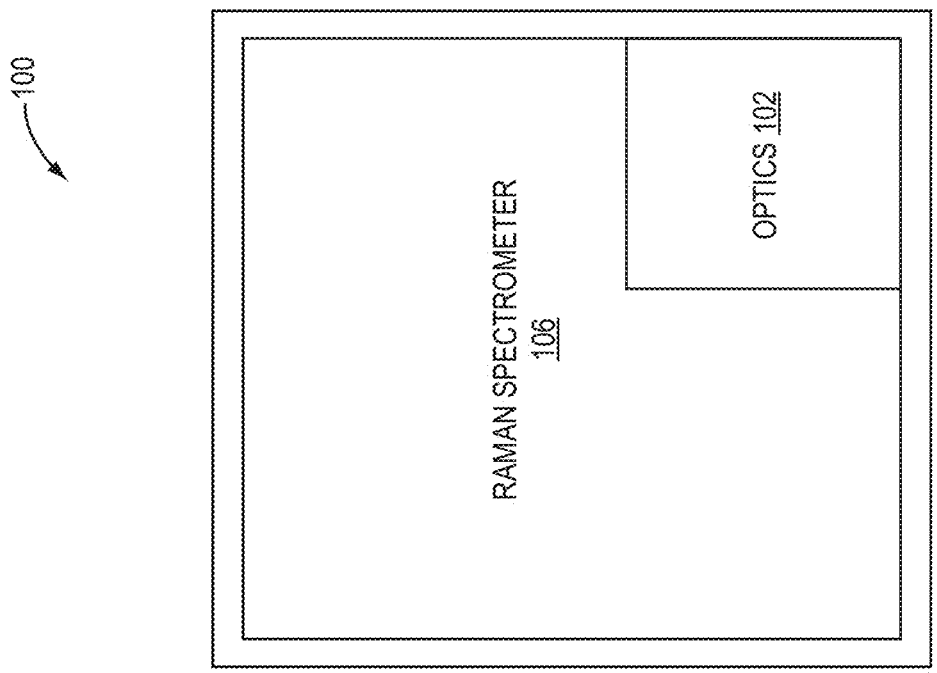
FIG. 1 illustrates an item 100 including the optics 102, user 104, computer 108 and Raman spectrometer 106 in communication with one another.
Figure 1:
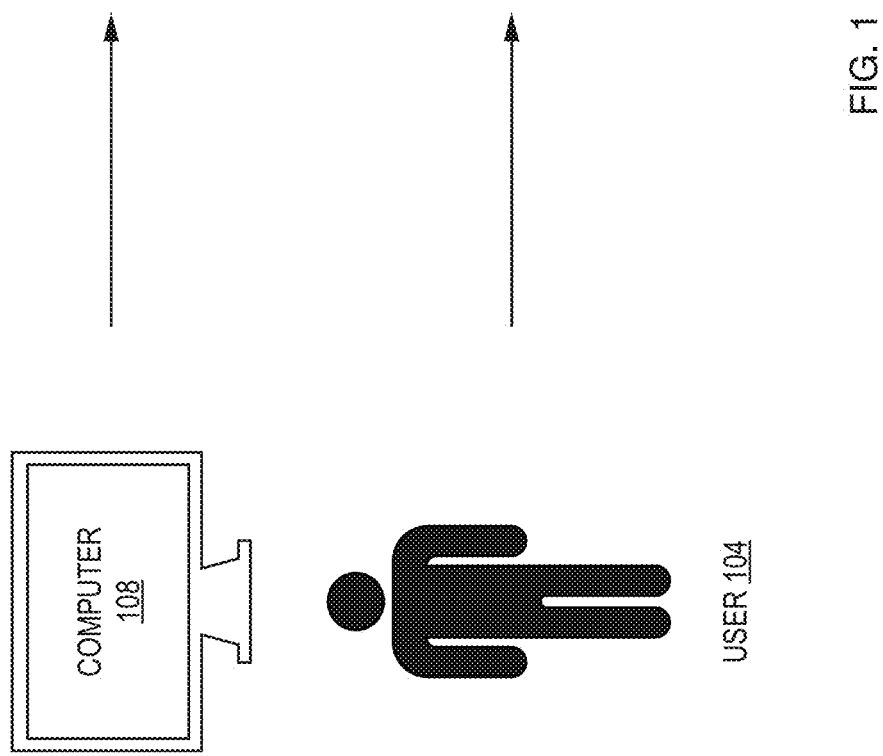

""traditional" Raman measurement" refers to a Raman system where the illumination spot diameter remains fixed size and has a uniform radial distribution "Aspheric diffuse ring producing optic" refers to One embodiment for producing the distributed spot includes an aspheric diffuse ring producing optic, or ADRPO. For example, embodiments of aspheric optics may include what is referred to as an axicon or conical optic which produces a ring of intensity but has higher order aspheric terms to produce the spread-out pattern. In the described example the aspheric optic may have coefficients of $A1=-0.01$, $A2=-0.06$, and $A4=0.002$, with all other terms being zero.

"Collimating lens" refers to optical elements that transform the incoming light direction to parallel paths "Filter" refers to optical elements that remove some wavelengths of incoming light "Focusing optics" refers to optical elements that transform the incoming light direction to a point in space "Light source" refers to A light source used for excitation in a spectroscopy application. May include a laser that is adapted for Raman spectroscopy such as 785 nm or 1064 nm. The light source could also include a broad band source such as an LED.

"Moving mount" refers to a mechanical assembly allowing an optical element to move in a linear fashion "Non-uniform radial spot distribution" refers to an illumination area that has an intentionally varying uniformity from center to edge "Sample surface plane" refers to the surface of the sample under test where the illumination area is directed "Steering mirrors" refers to optical elements used to change the direction of light path "Uniform radial spot distribution" refers to an illumination area that has a nominally consistent uniformity from center to edge "Voice coil" refers to Voice coil actuators (VCAs) are direct drive, limited motion devices that utilize a permanent magnet field and coil winding (conductor) to produce a force that is proportional to the current applied to the coil.

The subject invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Raman spectroscopy systems can be used in a variety of environments to identify unknown materials, to evaluate the threat posed by unknown materials, to provide positive identification of packaged raw materials, and to provide general security screening functions of a variety of substances. Raman spectroscopy systems can be implemented in a wide range of sizes, from portable, handheld instruments to larger systems in permanent laboratories.

As depicted in FIG. 1, user 104 interacts with Raman spectrometer 106 and computer 108 in order to take Raman spectroscopy measurements using the system. In one embodiment, computer 108 and Raman spectrometer 106 are packaged together as a portable system that can be operated on battery power for use outside a laboratory setting. The system may be a fully integrated device or may be configured as separate units for computer 108 and Raman spectrometer 106. In some embodiments, computer 108 may be located separate from Raman spectrometer 106 providing the opportunity for increased computing power at a central location. One skilled in the art can envision various interconnections, both physical and wireless, between the components of the system.

One embodiment for producing the distributed spot includes an aspheric diffuse ring producing optic, or ADRPO. For example, embodiments of aspheric optics may include what is referred to as an axicon or conical optic which produces a ring of intensity but has higher order aspheric terms to produce the spread-out pattern. In the described example the aspheric optic may have coefficients of $A1=-0.01$, $A2=-0.06$, and $A4=0.002$, with all other terms being zero.

Figure 2:
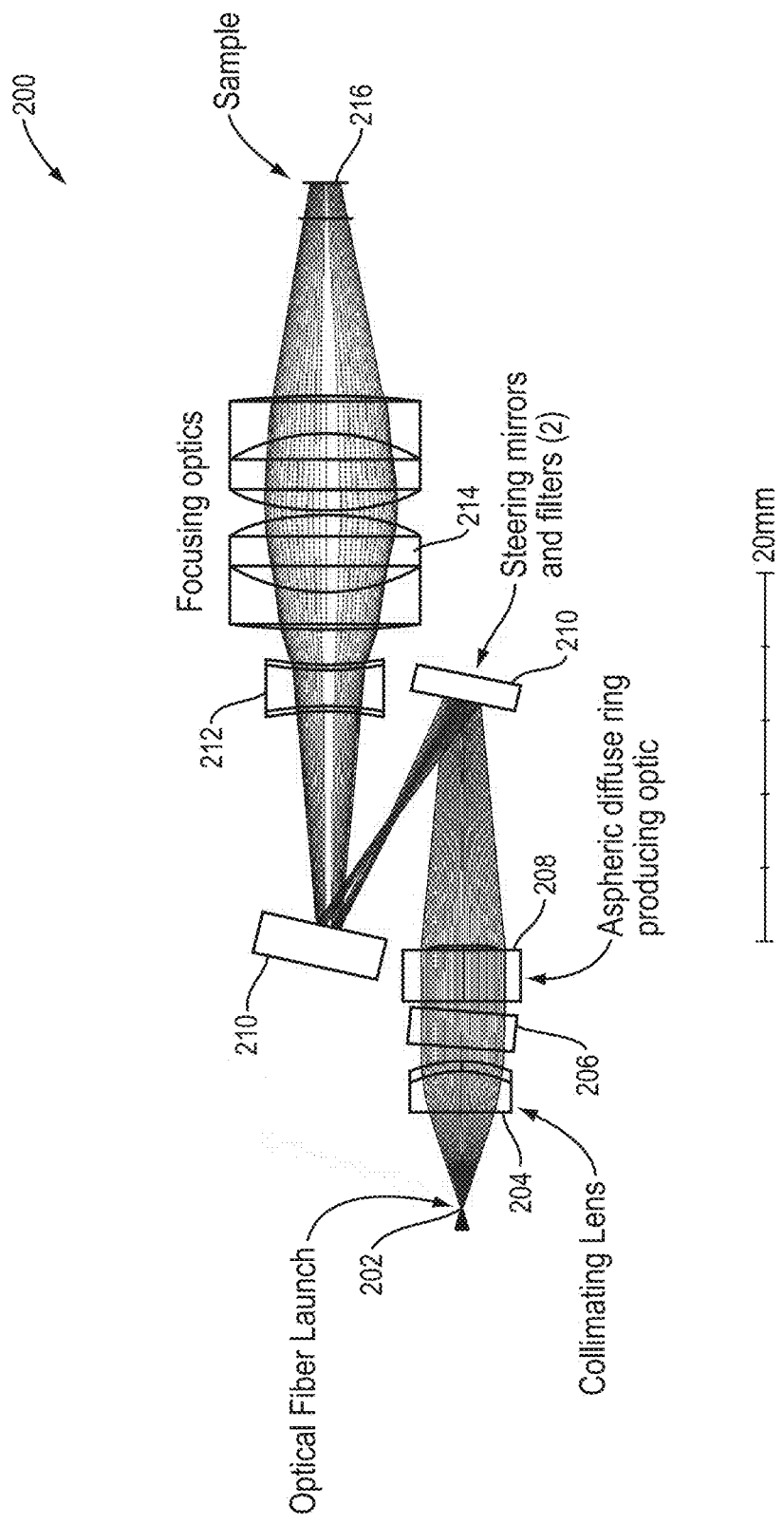
FIG. 2 is an illustration of one embodiment of optical configuration 200 of optics 102 configured to achieve a variable focus distributed illumination spot.

Turning to FIG. 2. The optical arrangement can be manipulated in order to change the diameter of the spot. For example, moving collimating lens 204 to the left (toward the optical fiber input) by about 3.0 mm, as shown in the following diagram results in a reduction in spot diameter.

FIG. 2 description of elements: optics 102 may include optical configuration 200 with various elements coupled to light source 202 that includes any type of light source known in the art that produces a beam of light useable for Raman spectroscopy. Light source 202 may be configured for direct input to optical configuration 200, or light source 202 may be fiber optically coupled to optical configuration 200. Collimating lens 204 may be designed to optimally capture substantially all of the light from the beam output from light source 202 and produce a substantially collimated beam. Collimating lens 204 can be movably mounted such that it can change position along the axis of the optical path. For example, the range of motion in the described embodiment is about 0.1 mm to about 10 mm to allow for a change in spot size on the sample surface to range from about 10 microns to about 10 mm. Collimating lens 204 directs the substantially collimated beam into aspheric diffuse ring producing optic 208 configured to produce a light pattern that is radially diffuse. The intensity of the output from aspheric diffuse ring producing optic 208 is more intense at the outer edge of the resulting pattern than in the center. While this pattern could be projected directly onto sample surface plane 216, in practical application it is advantageous to use one or more steering mirrors 210, one or more filters 206, and focusing elements such as concave focusing lens 212 and focusing optics 214, to direct the radially diffuse light pattern onto sample surface plane 216.

Figure 3:
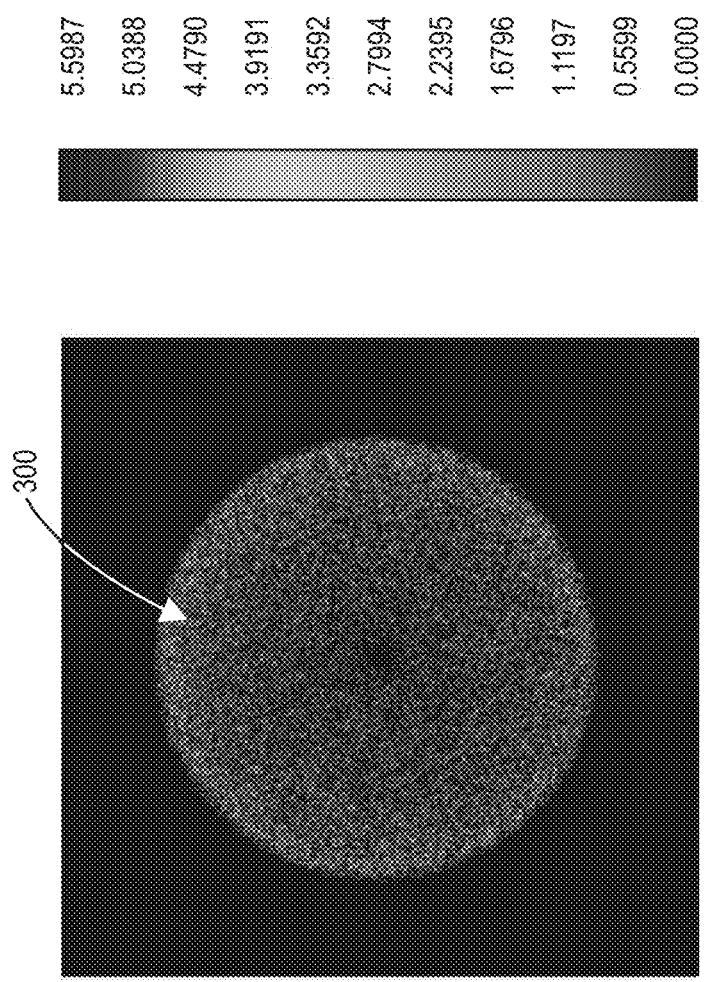
FIG. 3 illustrates spot intensity distribution 300 in accordance with one embodiment.

FIG. 3 shows an image of spot intensity distribution 300. The non-uniform distribution shows the higher relative intensity at the outer edges than in the center (e.g. centroid). A sample output from optical configuration 200 that shows the non-uniform distribution of the spot intensity. Of particular note is that the spot still has some level of intensity in the center of the distribution that gradually increases in intensity towards the edge which has the highest level of intensity. The diameter of the spot can be controlled in a range of about 10 microns to as large as about 10 mm in diameter.

Figure 4:
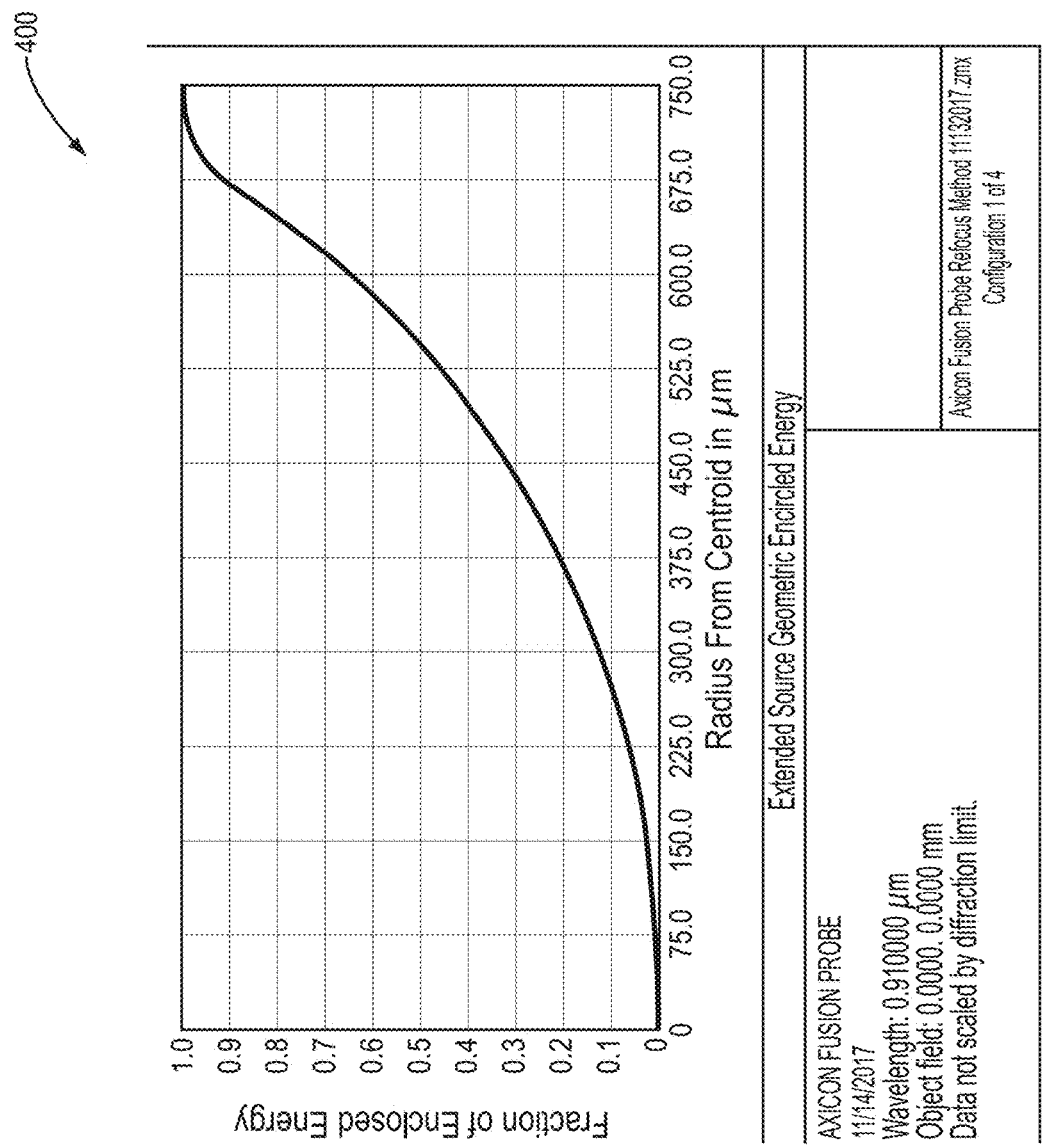
FIG. 4 illustrates cumulative intensity plot 400 that shows the relative intensity by radius distance from a centroid in accordance with one embodiment.

FIG. 4 is an illustrative example of plot 400 of cumulative intensity versus radius distance from a centroid out to a 750-micron radius for a 1.5 mm diameter spot. As can be seen from the plot, the central region intensity is fairly low producing an intensity that is just above background levels. The intensity rapidly increases towards the outer extents of the profile, that is referred to herein as a "diffuse ring type pattern". The specific level of illumination at the center, as well as the characteristics of the diffuse ring curve could be altered depending on one or more characteristics of optical configuration 200 (e.g. relative distance between collimating lens 204 and aspheric diffuse ring producing optic 208) that may include the optical properties of the aspheric diffuse ring producing optic 208 (ADRPO).

Figure 5:
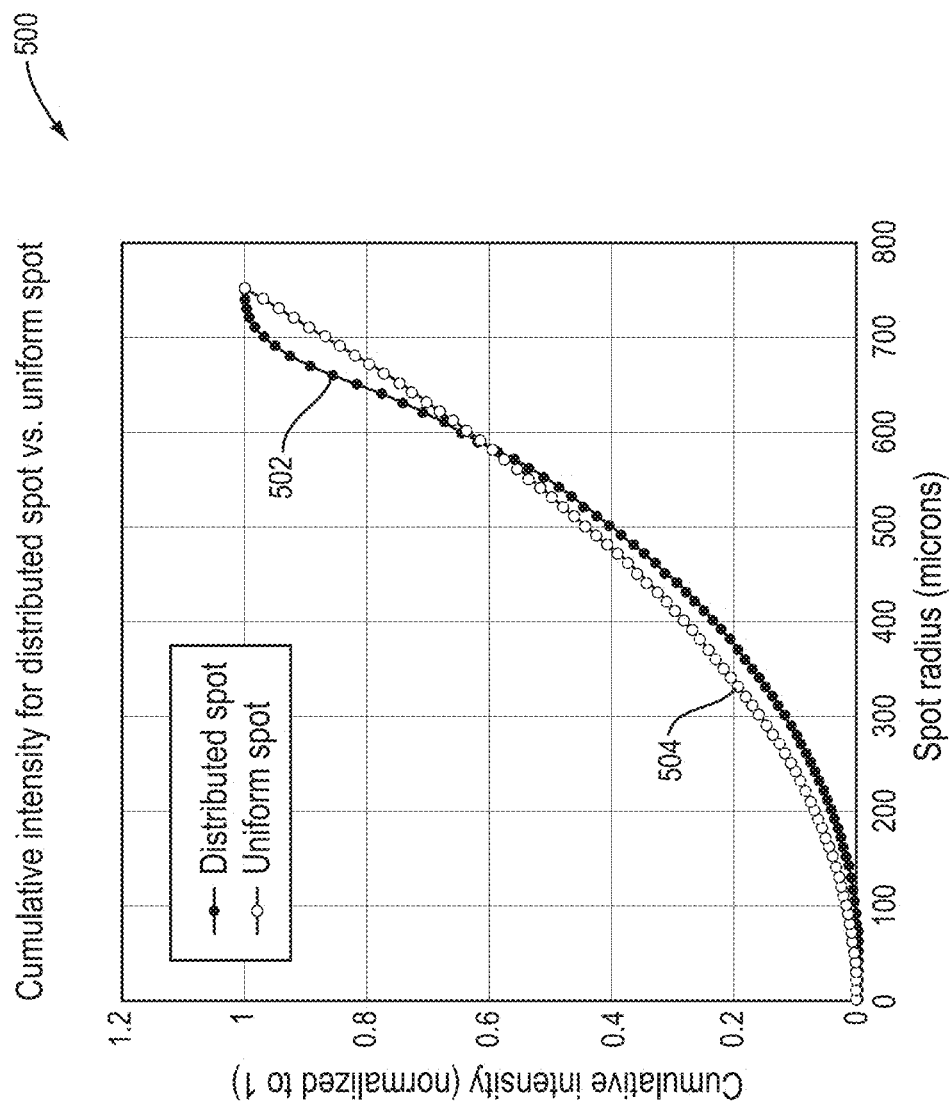
FIG. 5 illustrates cumulative intensity plot 500 in accordance with one embodiment.

FIG. 5 compares the cumulative intensity in plot 500 of a diffuse spot with a uniform spot. In a traditional Raman spectroscopy arrangement, the illumination spot is of substantially uniform intensity across its diameter. As you can see in FIG. 5, the intensity of the traditional uniform radial spot distribution 504 is substantially linear from its origin to its edge. Comparatively, aspheric diffuse ring producing optic 208 produces non-uniform radial spot distribution 502 that shows a substantially non-linear cumulative intensity from origin to edge.

Figure 6:
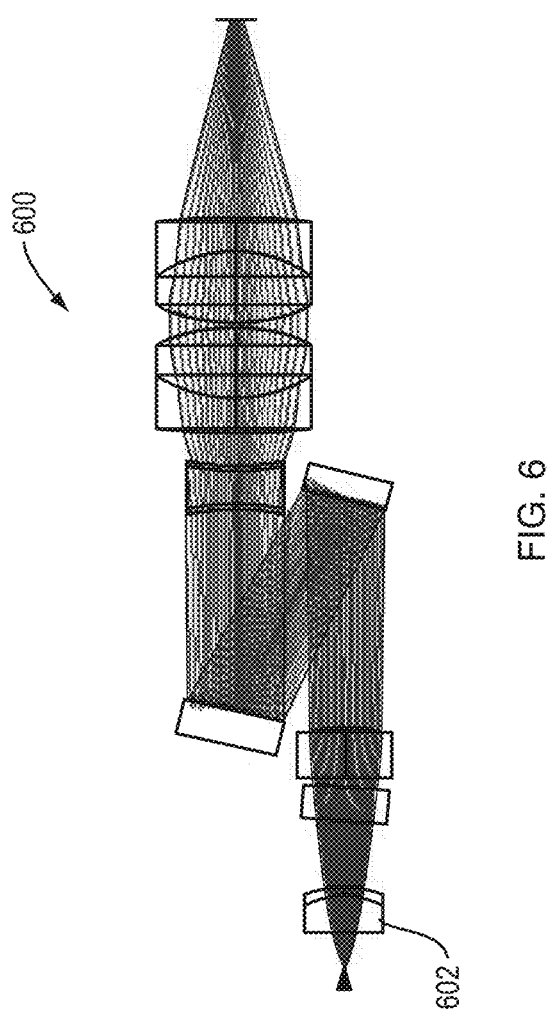
FIG. 6 illustrates optical arrangement 600 in accordance with one embodiment.

FIG. 6 is an illustrative example of optical arrangement 600 wherein movement of the collimating lens 204 using collimating lens moving mount 602 effects the spot diameter. In some embodiments collimating lens moving mount 602 comprises a linear positioning assembly capable of micron resolution. In some cases, collimating lens moving mount 602 comprises a voice coil, however other types of moving mount known in the art may be employed. For example, collimating lens moving mount 602 may include a piezo, motor, or other type of linear positioning assembly known in the art.

As the distance between collimating lens 204 and aspheric diffuse ring producing optic 208 changes (e.g.—collimating lens 204 is moved relative to the position of aspheric diffuse ring producing optic 208), the spot diameter will change. For example, as the distance increases the spot diameter becomes smaller and as the distance decrease the spot diameter becomes larger.

Figure 7:
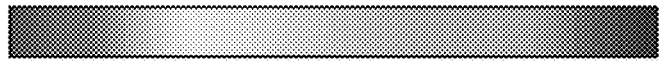
FIG. 7 illustrates false color spot image 700 in accordance with one embodiment.
Figure 7:
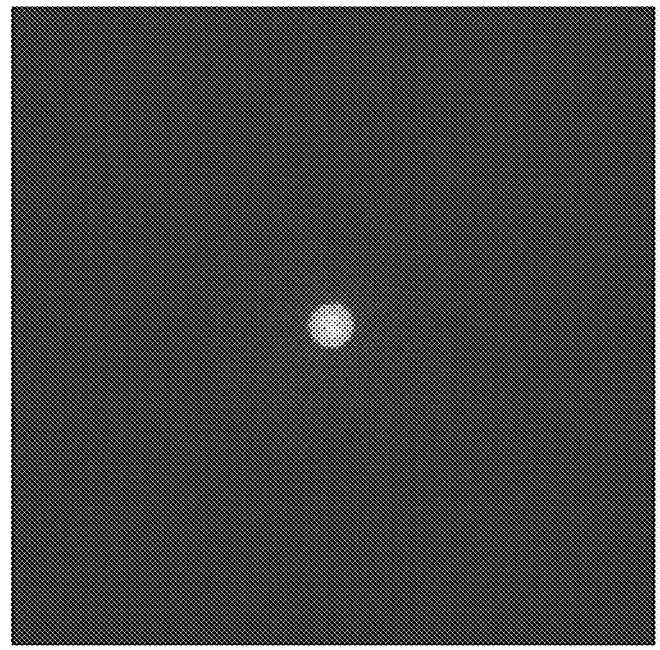

FIG. 7 is an illustrative example (using a false color spot image 700) of the spot focused to about a 900 micron diameter using optical configuration 200, with the distance between collimating lens 204 and aspheric diffuse ring producing optic 208 configured to generate a spot with an intensity distribution that has enough uniformity for "traditional" Raman measurement. Thus, optical configuration 200 enables "traditional" Raman measurement, as well as measurements where the spot is made larger producing a more pronounced diffuse ring type pattern as the diameter increases.

Figure 8:
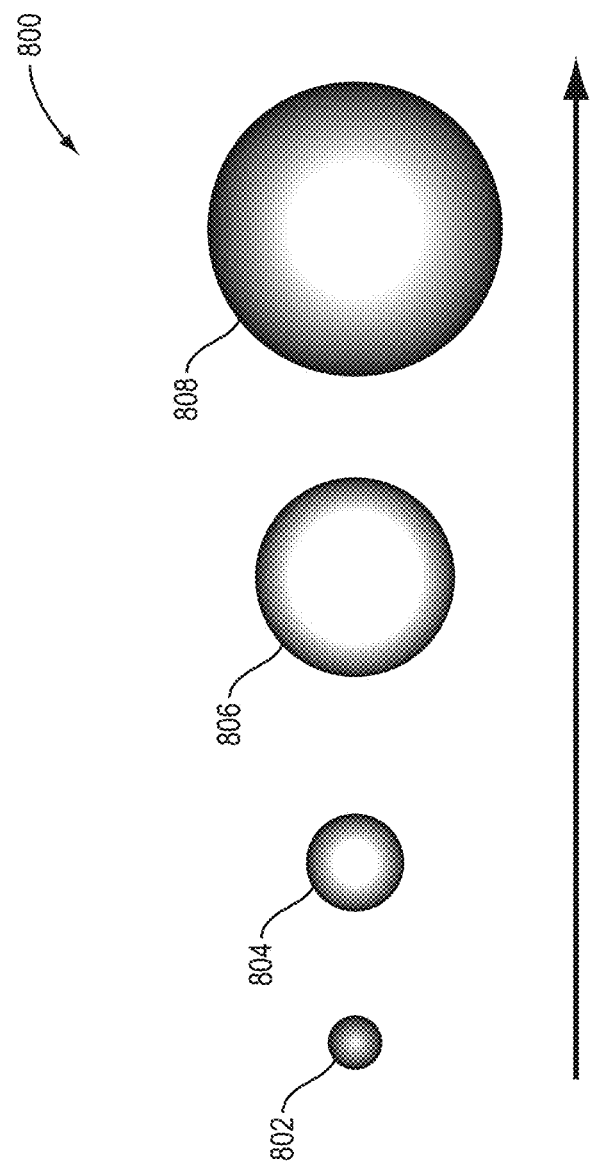
FIG. 8 illustrates adjustable illumination spot diameter 800 in accordance with one embodiment.

FIG. 8 is an illustrative example of embodiments of the adjustable illumination spot diameter 800 comprising different diameters. A tightly focused spot 802 illustrates a substantially uniform intensity although it will be appreciated that some intensity distribution exists; medium spot 804 illustrates a discernable diffuse ring type pattern (e.g. higher degree of intensity distribution/non-uniformity than spot 802); medium-large spot 806 illustrates a more pronounced diffuse ring type pattern than medium spot 804 (e.g. higher degree of intensity distribution/non-uniformity than spot 804); and large diameter spot 808 illustrates a clearly defined diffuse ring type pattern (e.g. highest degree of intensity distribution/non-uniformity). Importantly, each of spots 802, 804, 806, and 808 maintain a degree of non-uniform radial intensity distribution at all sizes. In other words, the degree of non-uniformity of the intensity distribution is directly related to the diameter of the spot.

While the present invention has been illustrated by a description of an exemplary embodiment and while this embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A system, comprising:
a light source configured to produce a light beam;
a collimating lens configured to capture the light beam and produce a substantially collimated beam;
an aspheric diffuse ring optic configured to receive the collimated beam and produce a spot on a surface that comprises a non-uniform radial intensity distribution; and
wherein the aspheric diffuse ring optic has aspheric coefficients that comprise A1=−0.01, A2=−0.06, and A4=0.002.

2. The system of claim 1, wherein:
the collimating lens is disposed on a movable mount.

3. The system of claim 2, wherein:
the moveable mount is configured to translate the collimating lens up to 10 mm in distance.

4. The system of claim 2, wherein:
the moveable mount is configured to adjust a relative position between the collimating lens and the aspheric diffuse ring optic to produce the spot with a diameter in a range from about 10 micron to about 10 mm.

5. The system of claim 4, wherein:
the spot comprises a degree of the non-uniform radial intensity distribution, wherein the degree is associated with the diameter.

6. The system of claim 2, wherein:
the moveable mount comprises a voice coil.

7. The system of claim 2, wherein:
the moveable mount comprises a linear positioning assembly with micron resolution.

8. The system of claim 1, further comprising:
one or more steering mirrors and one or more focusing optics configured to direct the spot onto the surface.

9. A method, comprising:
producing a light beam;
producing a substantially collimated beam from the light beam;
receiving the collimated beam into an aspheric diffuse ring optic that has aspheric coefficients that comprise A1=−0.01, A2=−0.06, and A4=0.002; and
producing a spot on a surface that comprises a non-uniform radial intensity distribution from the collimated light beam.

10. The method of claim 9, wherein:
changing a diameter of the spot in a range from about 10 micron to about 10 mm.

11. The method of claim 10, wherein:
the spot comprises a degree of the non-uniform radial intensity distribution, wherein the degree is associated with the diameter.

12. A system, comprising:
a light source configured to produce a light beam;
a collimating lens configured to capture the light beam and produce a substantially collimated beam;
an aspheric diffuse ring optic configured to receive the collimated beam and produce a spot on a surface that comprises a non-uniform radial intensity distribution, wherein the aspheric diffuse ring optic has aspheric coefficients that comprise A1=−0.01, A2=−0.06, and A4=0.002; and
wherein the collimating lens is disposed on a moveable mount, the moveable mount is configured to translate the collimating lens up to 10 mm in distance.

13. The system of claim 12, wherein:
the moveable mount is configured to adjust a relative position between the collimating lens and the aspheric diffuse ring optic to produce the spot with a diameter in a range from about 10 micron to about 10 mm.

14. The system of claim 12, wherein:
the spot comprises a degree of the non-uniform radial intensity distribution, wherein the degree is associated with the diameter.

15. The system of claim 12, wherein:
the moveable mount comprises a voice coil.

16. The system of claim 12, wherein:
the moveable mount comprises a linear positioning assembly with micron resolution.

17. The system of claim 12, further comprising:
one or more steering mirrors and one or more focusing optics configured to direct the spot onto the surface.

* * * * *